March 5, 1968  E. GROSKOPFS ET AL  3,371,453

CASSETTE STEM DEVICE

Filed Aug. 3, 1964

*Inventors*
ERNEST GROSKOPFS
JOHN ARTHUR FRY by: *Cavanagh & Norman*

United States Patent Office
3,371,453
Patented Mar. 5, 1968

3,371,453
CASSETTE STEM DEVICE
Ernest Groskopfs, Toronto, Ontario, and John Arthur Fry, Willowdale, Ontario, Canada, assignors to The De Havilland Aircraft of Canada, Limited, Downsview, Ontario, Canada
Continuation-in-part of application Ser. No. 269,258, Apr. 1, 1963. This application Aug. 3, 1964, Ser. No. 387,163
5 Claims. (Cl. 52—108)

This invention relates to a cassette form of stem device.

This application is a continuation-in-part of application Ser. No. 269,258, filed April 1, 1963, for Extensible Retractable Stem Device and assigned to same assignee as this instant application.

In certain types of extensible spring strip carpenters rules and the like the concave inward spring strip may be forced into or pulled out of a container or cassette within which the coiled strip tensions itself outwardly towards the side walls of the container. The strip is not wound upon a drum in such form of device. The strip is wound within itself concave inwardly and the strip in free form is of an arcuate width of less than 180 degrees. Such a strip is not suitable for stem applications adapted to support substantial axial and transverse loads.

In said prior application Ser. No. 269,258 a drum class of stem device is disclosed wherein a stem strip in free form having of the order of about 180 degrees overlap of its side edges may be projected to very great length up to thousands of feet in self-supporting form while of a diameter of less than one-hundredth of its length, for example, one-thousandths of its length, the said stem strip being coiled about a motor driven drum in such manner that it is reeled thereon concave outwardly, that is, the inner end is fixed to the drum and the concave surfaces of the strip face outwardly from the surfaces of the drum though they are flat while reeled thereon. In such prior application the stem strip is retrieved from and reeled upon the drum under motor rotation of the drum to be extended or retracted in a direction substantially at right angles to the surface of the drum for maximum thrust support.

According to this invention in contrast to the prior art and in furtherance of the said prior application extensible and retractable stem structures may be formed for maximum thrust support in a cassette by tangential take-off, that is, projection and retraction of the stem strip or strips but wherein the motor power for such extension or retraction is applied to the strip or strips within said cassette. Moreover, it is a further object of this invention to provide a cassette form having encyclic retaining members or surfaces moving at the same velocity as surfaces of said strip in contained contact therewith.

Other objects of the invention will be apparent from a study of the following specification taken in conjunction with the accompanying drawings.

Figure 1:
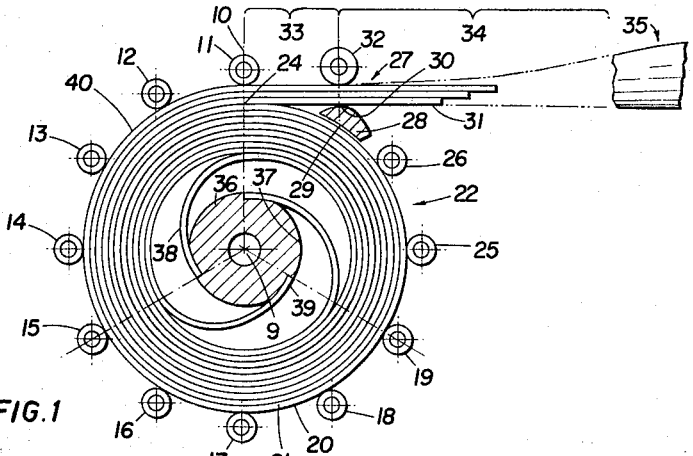
FIGURE 1 is a diagrammatic illustration only of the principles of the structure involved in the improved extensible retractable cassette type device of the invention.

Referring to FIGURE 1 it may be illustrated diagrammatically according to this invention that beginning with a tangential take-off line 10 and proceeding encyclically counter-clockwise from a roller 11 through to roller 15, that is, through 120 degrees, such rollers may be located on the same arc, that is, at the same radius from a centre 9. Through the next 120 degrees from rollers 15 through 19 the outer surface 20 of an outermost strip 21 may be confined within substantially the same arc at the same or slightly lesser radius from the centre 9. The final 120 degree sector 22, however, must be restricted to an arc from roller 19 to the first overlap line 24 of the combined or single stem strip as the case may be to just meet the surfaces thereof at said line whereby said rollers 25 and 26 are located at progressively lesser radius from centre 9. Roller 26 is spaced from the multiple form of stem strip 27 shown and roller 11 a sufficient distance to accommodate a doctor member 28 having an inner arcuate surface 29 adapted to support the outer surface 20 in the region between roller 26 and line 24 and preferably having thereon an upper supporting surface 30 for support of the under surface 31 of the under or the innermost surface of the strip or strips 27 being in alignment with a form roller or idler 32 to provide stabilizing means for said strip in the take-off region 33 shown between the tangential take-off roller 11 and a guiding zone 34 beyond which the strip is concave outward as indicated at 35 until it reaches tubular overlap and extends beyond in substantially rigid tubular form.

It is desired according to the invention that at the line 10 being the point of tangential take-off of multiple elements will be moving past this line during extension or retraction at the same velocity so that beyond said tangential line the extended portion of the stem element formed of multiple plies is not subjected to a sliding of such plies or strips one relative to the other. Within the cassette however, the strips slide upon one another but are controlled in such sliding motion by the fastening of their inner ends that is, their anchored ends to a small diameter inner drum 36 and anchored thereto at 120 degree points 37, 38 and 39. Said drum 36 is caused to rotate at a radial speed conforming to that developing peripheral speed of the outer surface 40 of the outermost strip 27 being the velocity of all said strips at the point of tangency 10. Accordingly, during retraction drum 36 reels the multiple strip or strips tightly thereon until fully retracted. During extension drum 36 serves in providing a control over the speed of projection of each of the strips but the same may be extended substantially by inherent tensions of the strips themselves under confinement of the cassette defined by the encyclic retaining rollers described, that is, rollers 11 to 19 and 25 to 26.

Figure 2:
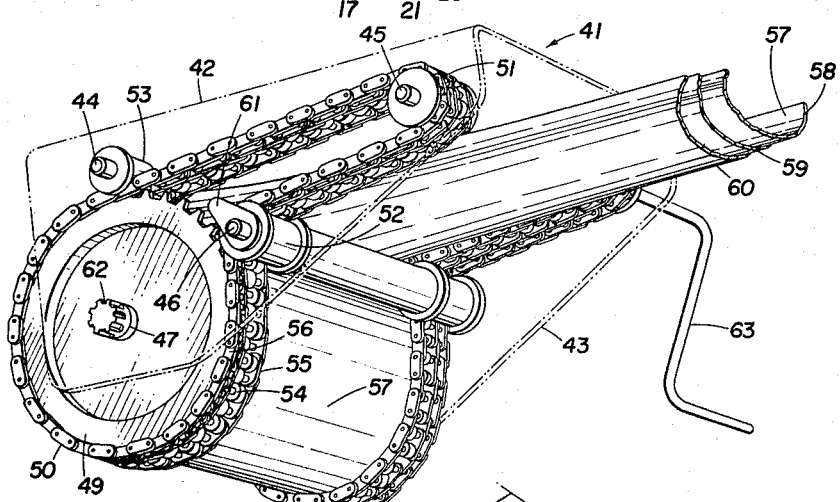
FIGURE 2 is a perspective view of a practical form of the device according to this invention of elementary design.

An elementary but practical form of the device of the invention is revealed in FIGURE 2 wherein a frame structure 41 shown in chain lines embodies side supports 42, 43 in which shafts 44, 45, 46 and 47 are journaled. When said supports on shaft 47 are provided spaced apart sprockets 49 each carrying an endless chain 50 extending to a driving sprocket 51 of shaft 45 between roller 52 on shaft 46 and roller 53 on shaft 44. Between said chains 50 and forming a lateral extension thereof and moving therewith are link connected rollers 54 connected by links 55 forming a laterally extending part of the linkage 56 of the chains 50. The rollers 54, however, define an encyclic cassette by engagement with the external surface 57 of the outermost strip 58 of the overlying strips 58, 59 and 60. The doctor support member (not shown) is pivotally supported between arms 61 extending from shaft 46. Within the cassette defined is provided a drum (not shown) of relatively small diameter rotatable on shaft 47, the latter being rotatable with sprocket 49. Thus, motor power applied to pinion 62 on shaft 47 would be the equivalent of the motor power applied to the shaft 45 by way of a hand crank 63 or other driving mechanism. Thus, in the form of the cassette described with reference to FIGURE 2 the outer surface supporting rollers move with such outer surface at the peripheral speed thereof and on a constant radius during engagement with said outer surface and to this extent are encyclic. Shaft 45 is so located with reference to the emerging stem strips as to be substantially sufficiently only outward of their line of tangency relative to the effective encyclic radius of said rollers 54 having regard to the outward curling of said stem strips as to provide for clearance therewith whereby said roller and sprocket chain structures are located free of interference with the emerging stem strip. To achieve this shafts 44 and 45 may be described as being located in a plane substantially parallel and adjacent to a line of tangency extending from the outermost contained surface of the cassette coil strips.

The utilization of a form roller or idler 32 such as was described with reference to FIGURE 1 may be avoided so long as a guiding section having substantially full and developing control is provided from a region near the doctor beyond to a region of substantial overlap of the stem strip.

Figure 3:
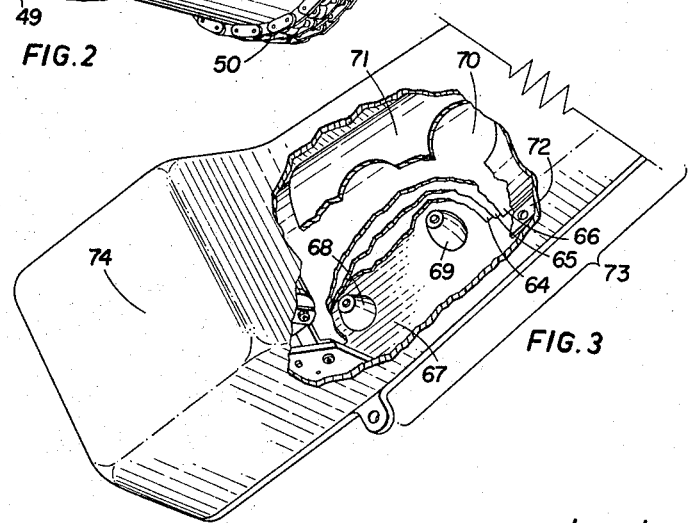
FIGURE 3 is a partially cut-away partial perspective view of a device of the invention relieving stem guide means therefor.

Thus, in the form of structure revealed in FIGURE 3 the stem strips 64, 65 and 66 are permitted to curl toward a confining platform 67, said platform having thereon anticurling idlers 68, 69 supporting inwardly curling surfaces to define a desired contour therefor during emergence while the undersurfaces 70 of strip 66 are confined against buckling by an anti-buckling guide 71 also mounted by its flanges 72 to the platform 67 thus to define controlled contour extension and retraction in the guiding zone 73. In the form of the device shown in FIGURE 3 outer housing 74 is also supported on platform 67 and encloses a cassette structure of the kind disclosed with reference to FIGURE 2.

It will be apparent from the foregoing that the cassette form of extensible and retractable stem device of the invention by virtue of the support of the strip by the restraint of the encyclic retaining means such as the peripheral rollers described permits the extension and retraction of relatively large structures of stem device especially of multiple strip or ply form. The width of the strip is such as to overlap upon forming a tubular structure and is therefore greater in width than three times the diameter of the stem tube formed when in the free state.

The inner cylindrical drum is driven for rotation thereof. It is to be noted that the stem strips are fastened to the drum substantially tangentially to dispose the concave inner surface of each strip outwardly with respect to the cylindrical surface of the drum and adapting the full width of the strip to be reeled upon the drum in full contact of convex surfaces of the strip therewith. The endless chain and roller structure described function as encyclic retaining means at each end of the drum controlling the path of motion of the outermost strip reeled thereon through about 300 degrees of arc of predetermined radius substantially greater than the radius of the drum and additionally on a tangent line from one end of the arc in the same tangent direction as that of the anchorage of the strip to the drum. In this way, the strip is enabled due to its curling under inherent tensions to draw itself free of the encyclic retaining means as it proceeds in the tangent direction beyond said arc. A form roller is engageable with the outermost strip coiled between the drum and the encyclic means substantially at the point of tangency of the tangent line of the retaining means with said arc. By virtue of relative motion permitted between plural strip plies within the cassette between the outermost strip and the drum, rotation of the drum by driving means enables extension and retraction of all such strip plies together at the same velocity on said line of tangency or on substantially said line.

The encyclic retaining means may be provided by a plurality of rollers as indicated diagrammatically in FIGURE 1 or more especially by a flexible endless belt or chain device as revealed in FIGURE 2. Preferably in the latter instance, as shown, flexible endless encyclic retaining means in the form of said chain and associated guide or retaining rollers is driven at the same angular speed through said arc as the angular speed of rotation of said drum and especially this may be accomplished by the provision of ends on said drum in the form of the sprockets described so that sliding motion between the multiple plies or strips takes place in the storage region of the cassette between the drum and the encyclic retaining means.

What we claim is:

1. A cassette form of extensible and retractable stem device adapted to be driven during extension and retraction and comprising in combination: at least one stem strip of a length and width which when free defines a tube having a concave inner surface and of relatively small diameter as compared with its length the side edges of said strip being overlapped throughout the length of the tube and the width of said strip being greater than three times the diameter of the tube defined thereby; an inner cylindrical drum member having an axis of rotation; means anchoring one end of said strip substantially tangentially to said drum member to dispose the concave inner surface thereof outwardly and adapting the full width of said strip to be reeled upon said drum in full contact of the convex surfaces of said strip therewith; encyclic retaining means at each end of said drum controlling the path of motion of the strip reeled on said drum through about 300 degrees of arc of a predetermined radius substantially greater than the radius of said drum and on a tangent line from one end of said arc extending in the same tangent direction as the tangential anchorage of said strip to said drum; a form roller engageable with the strip coiled between said drum and said encyclic means and located substantially at the point of tangency of said tangent line with said arc means for driving said drum for extension and retraction of said strip at the same velocity on said line of tangency; and a doctor member substantially at the nip of tangency of said strip and the coiled strip within said encyclic retaining means between the other end of said arc and said tangent line.

2. A cassette form of extensible and retractable stem device adapted to be driven during extension and retraction and comprising in combination: at least one stem strip of a length and width which when free defines a tube having a concave inner surface and of relatively small diameter as compared with its length the side edges of said strip being overlapped throughout the length of the tube and the width of said strip being greater than three times the diameter of the tube defined thereby; an inner cylindrical drum member having an axis of rotation and means for rotatably driving said drum on said axis; means anchoring one end of each said strips substantially tangentially to said drum member to dispose the concave inner surface thereof outwardly and adapting the full width of said strip to be reeled upon said drum in full contact of the convex surfaces of said strip therewith; encyclic retaining means at each end of said drum controlling the path of motion of the outermost strip reeled on said drum through about 300 degrees of arc of a predetermined radius substantially greater than the radius of said drum and on a tangent line from one end of said arc extending in the same tangent direction as the tangential anchorage of said strip to said drum; a form roller engageable with the outermost strip coiled between said drum and said encyclic means and located substantially at the point of tangency of said tangent line with said arc; means for driving said drum for extension and retraction of each said strip at the same velocity on said line of tangency; said encyclic means at the same angular speed; and a doctor member substantially at the nip of tangency of said strip and the coiled strip within said encyclic retaining means between the other end of said arc and said tangent line.

3. A cassette form of extensible and retractable stem device adapted to be driven during extension and retraction and comprising in combination: at least one stem strip of a length and width which when free defines a tube having a concave inner surface and of relatively small diameter as compared with its length the side edges of said strip being overlapped throughout the length of the tube and the width of said strip being greater than three times the diameter of the tube defined thereby; an inner cylindrical drum member having an axis of rotation; means anchoring one end of said strip substantially tangentially to said drum member to dispose the concave inner surface thereof outwardly and adapting the full width of said strip to be reeled upon said drum in full contact of the convex surfaces of said strip therewith; encyclic retaining means at each end of said drum controlling the path of motion of the strip reeled on said drum through about 300 degrees of arc of a predetermined radius substantially greater than the radius of said drum and on a tangent line from one end of said arc extending in the same tangent direction as the tangential anchorage of said strip to said drum; a form roller engageable with the strip coiled between said drum and said encyclic means and located substantially at the point of tangency of said tangent line with said arc; means for driving said drum for extension and retraction of said strip at the same velocity on said line of tangency; and sprocket means defining ends rotatable with said drum, said encyclic retaining means being in the form of an endless chain about each said sprocket and including rollers extending from each chain toward the other and adapted to confine said strip within said arc to define a cassette therefor.

4. A cassette form of extensible and retractable stem device adapted to be driven during extension and retraction and comprising in combination: at least two stem strips each of a length and width which when free defines a tube having a concave inner surface and of relatively small diameter as compared with its length the side edges of each of said strips being overlapped throughout the length of the tube and the width of each of said strips being greater than three times the diameter of the tube defined thereby; an inner cylindrical drum member having an axis of rotation; means anchoring one end of each said strips substantially tangentially to said drum member to dispose the concave inner surface thereof outwardly and adapting the full width of said strip to be reeled upon said drum in full contact of the convex surfaces of said strip therewith; encyclic retaining means at each end of said drum controlling the path of motion of the outermost strip reeled on said drum through about 300 degrees of arc of a predetermined radius substantially greater than the radius of said drum and on a tangent line from one end of said arc extending in the same tangent direction as the tangential anchorage of said strip to said drum; a form roller engageable with the outermost strip coiled between said drum and said encyclic means and located substantially at the point of tangency of said tangent line with said arc; means for driving said drum for extension and retraction of each said strip at the same velocity on said line of tangency; sprocket means defining ends rotatable with said drum, said encyclic retaining means being in the form of an endless chain about each said sprocket and including rollers extending from each chain toward the other and adapted to confine said strips within said arc to define a cassette therefor; and a doctor member substantially at the nip of tangency of said strips and a coiled strip within said encyclic retaining means between the other end of said arc and said tangent line.

5. A cassette form of extensible and retractable stem device adapted to be driven during extension and retraction and comprising in combination: at least two stem strips each of a length and width which when free defines a tube having a concave inner surface and of relatively small diameter as compared with its length the side edges of each of said strips being overlapped throughout the length of the tube and the width of each of said strips being greater than three times the diameter of the tube defined thereby; an inner cylindrical drum member having an axis of rotation; means anchoring one end of each said strips substantially tangentially to said drum member to dispose the concave inner surface thereof outwardly and adapting the full width of said strip to be reeled upon said drum in full contact of the convex surfaces of said strip therewith; encyclic retaining means at each end of said drum controlling the path of motion of the outermost strip reeled on said drum through about 300 degrees of arc of a predetermined radius substantially greater than the radius of said drum and on a tangent line from one end of said arc extending in the same tangent direction as the tangential anchorage of said strip to said drum; a form roller engageable with the outermost strip coiled between said drum and said encyclic means and located substantially at the point of tangency of said tangent line with said arc; means for driving said drum for extension and retraction of each said strip at the same velocity on said line of tangency; contour guide means for said stem strips between said point of tangency and beyond substantially to a point of self-envelopment of said strips by the side edges thereof; and a doctor member substantially at the nip of tangency of said strips and a coiled strip within said encyclic retaining means between the other end of said arc and said tangent line.

References Cited
UNITED STATES PATENTS

| | | | |
|---|---|---|---|
| 2,837,296 | 6/1958 | Zelnick | 242—84.8 |
| 3,144,104 | 8/1964 | Weir et al. | 52—108 |
| 3,144,215 | 8/1964 | Klein | 242—54 |
| 3,213,573 | 10/1965 | Bohr | 52—108 |
| 3,252,173 | 5/1966 | Robinsky | 52—108 X |
| 3,255,531 | 6/1966 | Anderson | 242—84.8 |

HENRY C. SUTHERLAND, *Primary Examiner.*

FRANK L. ABBOTT, *Examiner.*

ROBERT S. VERMUT, *Assistant Examiner.*